United States Patent [19]

Manges

[11] Patent Number: 4,542,858
[45] Date of Patent: Sep. 24, 1985

[54] ROTATABLE ELECTRIC CABLE CONNECTING SYSTEM

[75] Inventor: David R. Manges, Fulton, Md.

[73] Assignee: The United States of America as represented by the Administrator of the National Aeronautics and Space Administration, Washington, D.C.

[21] Appl. No.: 613,140

[22] Filed: May 23, 1984

[51] Int. Cl.$^4$ ..................... H02G 11/00; B65H 75/48
[52] U.S. Cl. ................................ 242/54 R; 242/107; 191/12.2 R
[58] Field of Search .............................. 242/54 R, 107; 191/12.2 R, 12.2 A; 414/744 A; 244/160, 173, 161; 248/186, 425, 550; 343/DIG. 2

[56] References Cited

U.S. PATENT DOCUMENTS

| | | | |
|---|---|---|---|
| 1,782,191 | 11/1930 | Bolling | 191/12.2 R |
| 1,868,409 | 5/1931 | Crispen | 191/12.2 R X |
| 1,946,778 | 2/1934 | Cline | 191/12.2 R |
| 3,305,103 | 2/1967 | Hilstrom | 242/107.5 |
| 4,395,005 | 7/1983 | Ganssle | 244/161 |

Primary Examiner—Stuart S. Levy
Assistant Examiner—Lloyd D. Doigan
Attorney, Agent, or Firm—John O. Tresansky; John R. Manning; Sol Sheinbein

[57] ABSTRACT

A cable reel assembly particularly adapted for, but not limited to, a system for providing electrical connection of power and data signals between an orbiter vehicle (12), such as a space shuttle, and a recovered satellite (14) and being comprised of two mutually opposing ring type structures (18, 20) having ±180° relative rotation with one of the structures being held in fixed position while the other structure is rotatable. Motor controlled berthing latches ($16_1$, $16_2$, $16_3$) and umbilical cable connectors ($17_1$, $17_2$) for the satellite are located on the rim (26) of the rotatable ring structure (18). The electrical cable assembly (56) is fed in two sections (58, 60) from the orbiter vehicle into the outer rim portion (40) of the fixed ring structure (20) where they are directed inwardly and attached to two concentrically coiled metal bands (67, 68) whose respective ends are secured to inner and outer post members of circular sets of guide pins (70, 72) located on opposing circular plate members (28, 42), one rotatable and one fixed, forming part of and located along a central axis (44) of the two structures. The cable sections (58, 60) are fed out as three output cable sections (62, 64, 66) through openings (63, 65) in the central portion of the circular plate (28) of the rotatable ring structure (18) where they are directed to the latches ($16_1$, $16_2$, $16_3$) and connectors ($17_1$, $17_2$) located on its rim (26).

12 Claims, 8 Drawing Figures

ROTATABLE ELECTRIC CABLE CONNECTING SYSTEM

ORIGIN OF THE INVENTION

The invention described herein was made by an employee of the United States Government and may be manufactured and used by or for the Government for governmental purposes without the payment of any royalties thereon or therefor.

TECHNICAL FIELD

The invention relates generally to a system of electrical connection between two members having relative movement therebetween and more particularly to a cable reel assembly for providing electrical connection of power and data signals between two mutually opposing members wherein one member is rotatable one full revolution with respect to the other member.

BACKGROUND ART

Various types of equipment require the connection of one or more electrical conductors between members which are subject to relative motion. Where this relative motion involves the rotation of one member with respect to the other, either a slip ring assembly is employed or a movable cable assembly is provided which permits the required rotation. Slip rings normally not only require an excess amount of space, but where both high currents and data signals are involved, there exists an undesired source of electromagnetic interference. Moreover, where cable assemblies are employed, there must be provided a cable harness which prevents entanglement, twisting and kinking of conductors which can result in either open circuit or short circuit failures in the cable.

STATEMENT OF THE INVENTION

Accordingly, it is an object of the invention to provide an improvement in cable assemblies for the transmission of electrical power and digital data signals between two mutually movable members.

Another object of the invention is to provide a cable assembly for providing electrical connection of power and data signals between two structures which are mutually rotatable.

Still another object of the invention is to provide an interconnecting cable assembly for providing the transmission of relatively high currents and data signals between a pair of mutually opposing rotatable ring structures and wherein one ring structure is adapted to rotate one full revolution with respect to the other ring structure.

These and other objects are achieved by means of a cable reel assembly for providing electrical connection of currents in excess of 40 amperes and data signals between two mutually opposing support members adapted to engage and supply a piece of electrical equipment, such as a captured satellite recovered by an orbiter vehicle. The support members comprise two ring type structures with one of the structures being held in a fixed position while the other structure is rotatable between stops through a range of 360°. An electrical cable assembly is fed into the outer rim portion of the fixed ring structure where it is directed inwardly and attached to coiled metal bands, the ends of which are secured to respective posts or guide pins located on opposing inner surfaces of interior circular plates connected to the rim portions and which are located along a common central axis. Rotation of the movable ring type structure causes the metal bands to contract and expand about a central pivot point with the cable assembly being fed out through openings in the central portion of the circular plate of the rotatable ring structure where it is directed to the outer rim portion for connection to the spacecraft where it can be powered up and tested in place on the orbiter vehicle.

The foregoing and other objects, features and advantages of the invention will become apparent from the following detailed description when taken in conjunction with the appended drawings.

DETAILED DESCRIPTION OF THE INVENTION

The present invention, although not limited to a specific use, has been specifically designed to be used in connection with the flight support system for a spacecraft which fits into the bay or an orbiter vehicle such as a space shuttle currently being operated by and flown by the National Aeronautic and Space Administration. The flight support system, moreover, fits into the bay of the orbiter vehicle to provide for satellite spacecraft launch or repair operations. Electrical power and data signals are coupled between the orbiter and satellite when it is in place in the orbiter bay, having been recovered, for example, by the recovery arm, not shown, of the shuttle for servicing and/or other operations prior to being relaunched.

Figure 1:
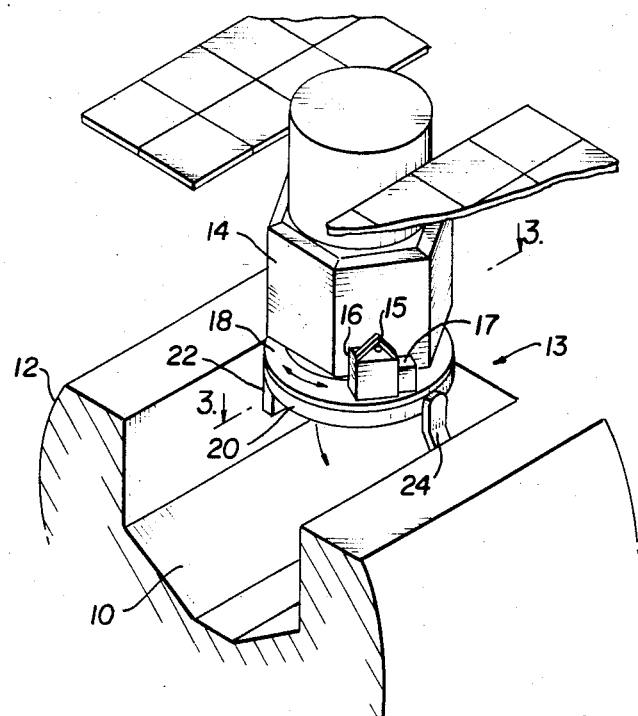
FIG. 1 is a perspective view partially in section of the operational environment of the invention.

This now leads to consideration of FIG. 1 wherein reference numeral 10 denotes the bay of an orbiter vehicle 12 wherein there is located a cradle assembly 13 for holding a spacecraft 14, e.g. a satellite, by means of a plurality of motor operated berthing latches 16 comprised of trunnion grabbers for gripping respective trunnions 15 and being located on an upper rotatable ring structure 18 annularly positioned above and operable in conjunction with a stationary ring structure 20 which is secured to a pair of cradle arms 22 and 24, the latter permitting the cradle assembly 13 including both the rotatable ring assembly 18 and the stationary ring assembly 20 to be tilted between a horizontal position as shown in FIG. 1 to a stowed vertical position within the bay 10.

Figure 2:
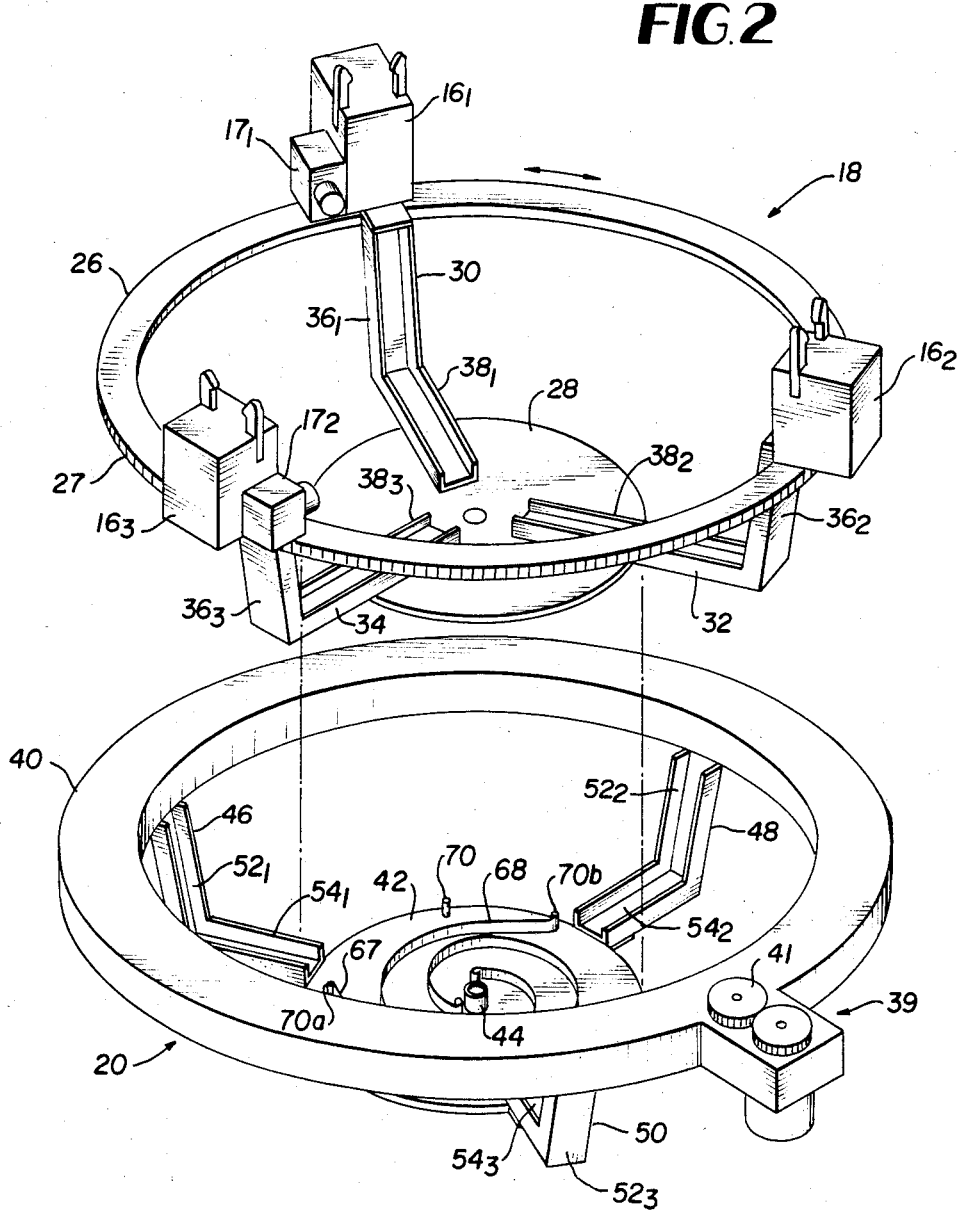
FIG. 2 is an exploded perspective view generally illustrative of the preferred embodiment of the invention.
Figure 4:
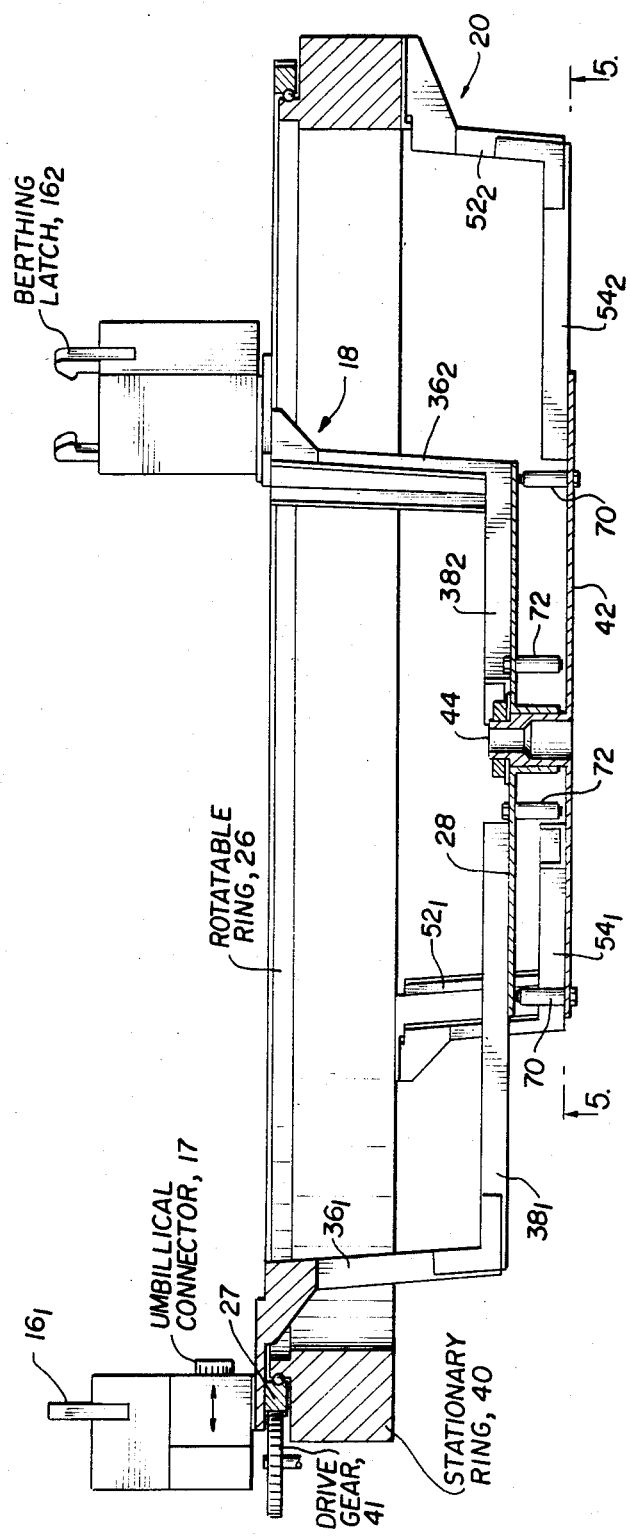
FIG. 4 is a sectional view of the embodiment of the invention taken along the lines 4—4 of FIG. 3.

The invention, however, is directed to the two annular ring assemblies 18 and 20, the details of which will now be considered. Referring collectively now to FIGS. 2 through 5, the rotatable ring structure 18 as shown in FIG. 2 is comprised of a relatively thin outer ring member 26 which is coupled to a relatively lower inner circular plate member 28 by three equidistantly spaced legs 30, 32 and 34 comprised of offset channel members, respectively including downwardly projecting outer end portions $36_1$, $36_2$ and $36_3$ and generally horizontal inner end portions 38, the latter being attached to the circular plate member 28.

In a similar fashion, the lower stationary ring assembly 20 is comprised of a relatively thick outer ring member 40. The ring 40, moreover, includes a drive motor and gear assembly 39 including a drive gear 41 which is positioned to engage and drive a peripheral ring gear 27 located on the rim of the rotatable ring member 26. The outer ring member 40 is mechanically linked to a relatively lower inner circular plate 42 which is of the same size and diameter as the upper circular plate 28 and is, moreover, aligned therewith about a central vertical axis which passes through a hub 44. The connection between the outer ring 40 and its inner plate 42 is likewise provided by three equidistantly spaced offset channel type connecting legs 46, 48 and 50, respectively comprised of downwardly projecting outer end portions $52_1$, $52_2$ and $52_3$ and horizontal inner end portions $54_1$, $54_2$ and $54_3$.

Figure 3:
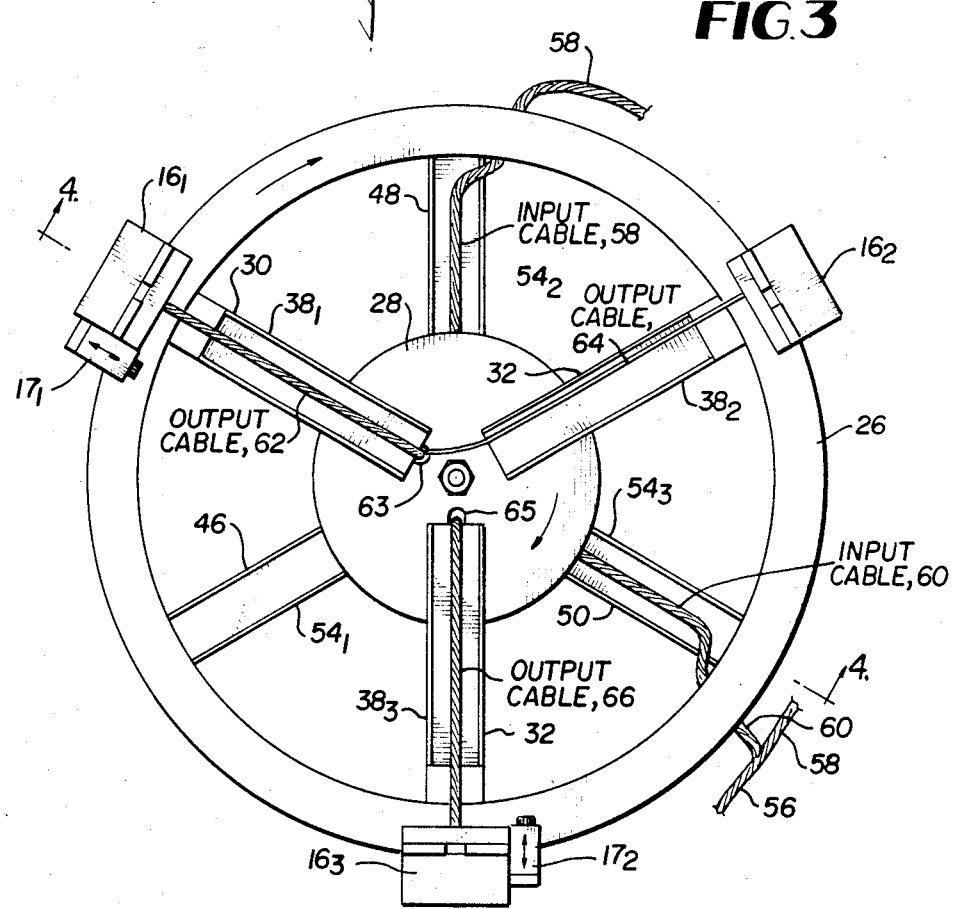
FIG. 3 is a top planar view further illustrative of the embodiment of the invention taken along the lines 3—3 of FIG. 1.
Figure 5:
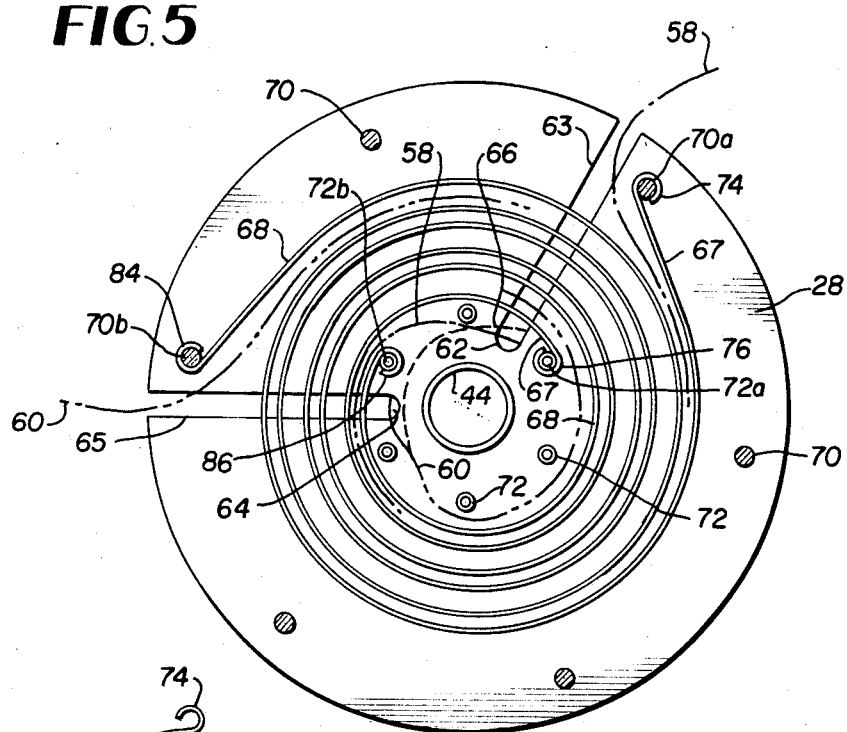
FIG. 5 is a sectional view taken along the lines 5—5 of FIG. 4 and being further illustrative of the spiral bands which form a part of the invention.

Further as shown in FIG. 3, a primary cable harness 56 located on the outside of the two ring structures 18 and 20 splits up into two multiple wire twisted cable sections 58 and 60 where they are respectively directed inwardly to the upper and lower circular plates 28 and 42 via two of the horizontal channel members $54_1$ and $54_2$. Although not shown, in FIG. 3 the cable sections 58 and 60 attach to a pair of elongated flexible bands, to be described in detail subsequently, located between the upper and lower circular plates 28 and 42 and which form in conjunction therewith a reel assembly. The cable sections 58 and 60 exit the upper plate 28 as three output cable sections 62, 64 and 66 from the inner end of a pair of elongated slots 63 and 65 (FIG. 5). The cable sections 62, 64 and 66 are directed outwardly via the offset channeled connecting arms 30, 32 and 34 to the upper rotatable ring member 26 on which there is located three electrically energized berthing latches $16_1$, $16_2$ and $16_3$ and two motor driven umbilical connectors $17_1$ and $17_2$. These umbilical connectors transmit power and data signalling to and from the satellite 14 (FIG. 1) when in position on the rotatable ring assembly 18 and held in position by activation of the berthing latches $16_1$, $16_2$ and $16_3$ which comprise scissor type trunnion grabbers. The output cable sections 62 and 66 include the wiring for the berthing latches $16_1$ and $16_3$ as well as the umbilical connectors $17_1$ and $17_2$ while the cable section 64 only comprises the wiring for energizing the berthing latch $16_2$.

This now leads to a consideration of the reel assembly, the details of which are shown in FIGS. 4 through 8 and which has for its purpose the providing of slip ring free cable routing between the annular ring structures 18 and 20 for a ±180° or full 360° rotation of the upper ring 26 with respect to the lower ring 40 and thus permits an operator to fully rotate the satellite 14, as shown in FIG. 1, while power is being transmitted thereto and data signals are transferred back and forth between the satellite 10 and the shuttle 12 while in the service bay 14.

As shown in FIG. 5, a pair of annular helically coiled elongated metal bands 67 and 68 have one end anchored to a respective outer post member 70a and 70b secured to the lower plate 42 (FIG. 4) which is fixed and at their other end to respective inner post members 72a and 72b secured to the upper plate 28 which is rotatable. It can be seen that such an arrangement will coil and uncoil the bands 67 and 68 when the upper plate 28 and accordingly the rotatable ring 26 connected thereto is rotated in one direction or the other. Moreover, as shown schematically in FIG. 5, the cable sections 58 and 60 are respectively attached to the inner surfaces of the bands 67 and 68 and are separated from each other. The separated cable sections are thus protected from one another as well as from undesirable exterior forces as the bands 67 and 68 are made to wind and unwind.

The outer post members 70a and 70b shown in FIG. 5 comprise one of a plurality of equally spaced circularly arranged post members 70 which are bolted (FIG. 4) to the outer periphery of the fixed or lower circular plate 42 which additionally operate as guide pins and a band expansion limit stop. The inner post members 72a and 72b likewise comprise one of a plurality of equally spaced post members 72 which are bolted on the upper rotatable circular plate 28 adjacent the hub 44 to provide a second set of guide pins and a band compression stop.

Figure 6:
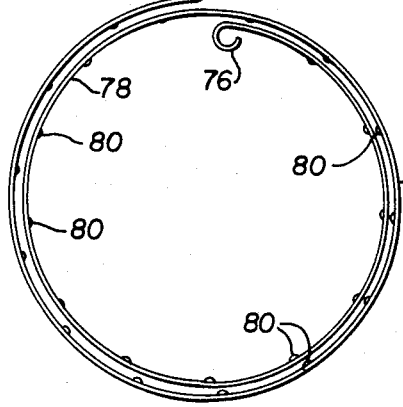
FIG. 6 is a top planar view of one of the spiral bands shown in FIG. 5.
Figure 7:
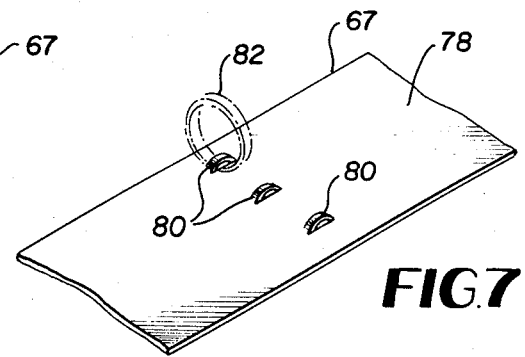
FIG. 7 is a partial sectional view of the spiral band shown in FIG. 6 shown in perspective to illustrate the raised tie points included therein.
Figure 8:
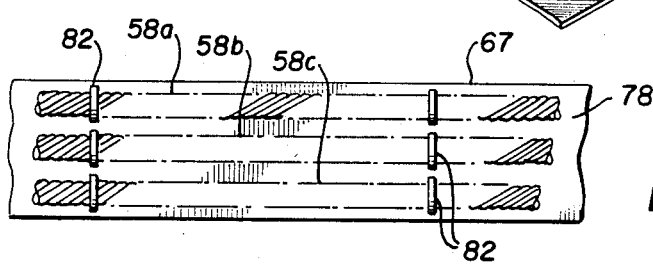
FIG. 8 is a partial sectional view illustrative of a cable section tied to the surface of one of the spiral bands shown in FIG. 6.

Further as shown in FIG. 6, one of the two identical bands 67 and 68, namely band 67 is shown comprised of relatively thin flexible material, preferably metal, having curled end portions 74 and 76 which are designed to anchor around the post members 70a and 72a, respectively, as shown in FIG. 5. The inner surface 78 of the band 67 additionally includes a number of equally spaced tie points 80 which comprise raised or struck metal portions as shown in FIG. 7 wherein, for example, the cable section 58 is further divided into twisted cable sections 58a, 58b and 58c which are secured to the inner surface 78 of the band 67 by plastic tie down straps 82 inserted through the tie points 80 as shown in FIG. 8. In the same fashion, inner metal band 68, as shown in FIG. 5, includes outer and inner end portions 84 and 86 which are respectively attached to the posts 70b and 72b and additionally include the same configuration of tie down points for securing the cable section 60 thereto.

Thus with the two electrical cable assemblies 58 and 60 tied down to the inner surfaces of the respective helically coiled metal bands 66 and 68, the ring member 26 of the upper rotatable ring structure 18 can be rotated by means of the drive gear assembly 39 on the ring member 40 of the fixed ring structure 20. Accordingly, as the satellite 14 is rotated within the cradle assembly 13, the cable sections within the confines of the circular plates 28 and 40 will expand or contract similar to that of a watch spring with the length of the coiled cable sections 58 and 60 being sufficient to allow for one full revolution of the upper ring structure 18 relative to the lower ring structure 20 as limited by a mechanical stop, not shown, on the outer ring members 26 and 40.

Although the cable connector of the subject invention is disclosed in context of a satellite in an orbiter service bay, it should be noted that the present invention has broader applicability in that it is adapted to be used in any instance where an electrical connection is desired between two bodies having relative movement, particularly rotation. Thus one conceivable application is the interconnection between the arms and body of robotics apparatus.

Having thus shown and described what is at present considered to be the preferred embodiment of the invention, all modifications, changes and alterations coming within the spirit and scope of the invention and as defined in the appended claims are herein meant to be included.

I claim:

1. A cable reel assembly for providing electrical connection between two structures having relative movement therebetween, comprising in combination:

first and second support members having mutually opposing inner surfaces spaced apart a predetermined constant distance, said support members being centered about a common axis and wherein said first support member is rotatable about said common axis while said second support member remains fixed relative to said first member;

a first plurality of means projecting outwardly from the inner surface of said first support member and being arranged in a generally circular configuration in relatively close proximity to and around said common axis;

a second plurality of means projecting outwardly from the inner surface of said second support member and arranged in a generally circular configuration around said common axis at a distance substantially greater than said first plurality of band stop means;

at least one elongated flexible band member located between said opposing inner surfaces of said support members and being attached at one end to one of said first plurality of means and at the other end to one of said second plurality of means whereby rotation of said first support member causes said band member to coil and uncoil depending upon the direction of rotation of said first support member;

a second elongated flexible band member located in substantial parallel arrangement with said first recited band member between said support members and being attached at one end to another of said first plurality of means and at the other end to another of said second plurality of means; and electrical connecting cable means secured to said at least one flexible band member and having thereby a rotatable moving end located at said one end of the member and a stationary end at said other end of the flexible band member.

2. The assembly as defined by claim 1 wherein said first and second support members are comprised of generally circular plates and wherein said first plate comprising said first support member includes at least one opening in the vicinity of said first plurality of means for the passage of the rotatable moving end of said electrical cable means therethrough.

3. The assembly as defined by claim 2 wherein said first and second plurality of means respectively comprise inner and outer sets of like dimensioned post elements extending between said inner surfaces of said plates.

4. The assembly as defined by claim 3 wherein said post elements are comprised of generally cylindrical bodies.

5. The cable assembly as defined by claim 2 wherein said electrical connecting cable means is comprised of first and second electrical cable assemblies respectively secured to the two flexible band members, and wherein said first circular plate includes two openings therein for the passage of said two cable assemblies therethrough in close proximity to said common axis.

6. A cable reel assembly for providing electrical connection between two structures having relative movement therebetween, comprising in combination:

first and second support members comprising first and second generally circular plates having mutually opposing inner surfaces spaced apart a predetermined constant distance, said support members being centered about a common axis and wherein said first support member is rotatable about said common axis while said second support member remains fixed relative to said first member;

a first plurality of means projecting outwardly from the inner surface of said first support member and being arranged in a generally circular configuration in relatively close proximity to and around said common axis;

a second plurality of means projecting outwardly from the inner surface of said second support member and arranged in a generally circular configuration around said common axis at a distance substantially greater than said first plurality of band stop means;

at least one elongated flexible band member located between said opposing inner surfaces of said support members and being attached at one end to one of said first plurality of means and at the other end to one of said second plurality of means whereby rotation of said first support member causes said band member to coil and uncoil depending upon the direction of rotation of said first support member;

electrical connecting cable means secured to said at least one flexible band member and having thereby a rotatable moving end located at said one end of the member and a stationary end at said other end of the flexible band member;

wherein said first plate comprising said first support member includes at least one opening in the vicinity of said first plurality of means for the passage of the rotatable moving end of said electrical cable means therethrough; and first and second ring members located outwardly of and respectively connected to said first and second circular plates.

7. The assembly as defined by claim 6 and additionally including a respective plurality of equally spaced connecting elements extending radially from said first and second circular plates to said first and second ring members.

8. The assembly as defined by claim 7 wherein said electrical cable means is fed from said second ring member inwardly via at least one connecting element coupling said second ring member to said second circular plate and coupled outwardly from said first circular plate to said first ring member via at least one connecting element coupling said first plate to said first ring member.

9. The assembly as defined by claim 7 wherein said plurality of connecting elements comprises three coupling arms connected between said first ring member and said first circular plate and three connecting arms coupling said second ring member and said second circular plate.

10. The assembly as defined by claim 7 wherein each connecting element comprises an offset channel connecting arm.

11. The assembly as defined by claim 10 wherein each offset channel arm is comprised of a downwardly projecting channel member connected to the respective ring member and a generally horizontal channel member extending inwardly from said downwardly projecting channel member to the respective circular plate.

12. The cable assembly as defined by claim 6 and wherein said first ring member additionally includes a peripheral ring gear located at the rim thereof and drive gear means coupled to said ring gear for supplying a rotatable drive to said first support ring.

* * * * *